United States Patent [19]

Mock

[11] Patent Number: 4,726,053
[45] Date of Patent: Feb. 16, 1988

[54] RESET SYSTEM FOR TELEPHONE ANSWERING MACHINE IN EVENT OF POWER FAILURE

[75] Inventor: Gerald L. Mock, Corona, Calif.

[73] Assignee: Fortel Corporation, Compton, Calif.

[21] Appl. No.: 840,006

[22] Filed: Mar. 17, 1986

[51] Int. Cl.[4] .............................................. H04M 1/65
[52] U.S. Cl. ........................................ 379/79; 379/70
[58] Field of Search ...................... 379/79, 70, 74, 77, 379/80, 82; 360/72.2; 381/110

[56] References Cited

U.S. PATENT DOCUMENTS

| | | | |
|---|---|---|---|
| 3,714,382 | 1/1973 | Sykes | 360/72.2 |
| 4,263,481 | 4/1981 | Ho et al. | 379/80 |
| 4,469,919 | 9/1984 | Nakamura et al. | 379/77 |

Primary Examiner—Raymond F. Cardillo
Assistant Examiner—James E. Tomassini
Attorney, Agent, or Firm—Keith D. Beecher

[57] ABSTRACT

A reset system for a telephone answering machine which, in the event of a power failure, or should the telephone answering machine be disconnected from the power mains, will reset the telephone answering machine when power is restored to the condition it was in just prior to the power failure. In a specific embodiment to be described, when power is restored, an incoming message magnetic tape is set to rewind for a selected time interval (for example, 2 to 3 seconds), and the number of pulses generated by the magnetic tape mechanism during that period are examined. If the number of pulses exceeds a predetermined minimum, it is assumed that there are incoming messages recorded on the tape, and the tape is returned to the position it occupied prior to rewind. In addition, control and indicator mechanisms within the system are set to the state they were in just prior to the power failure.

8 Claims, 5 Drawing Figures

RESET SYSTEM FOR TELEPHONE ANSWERING MACHINE IN EVENT OF POWER FAILURE

BACKGROUND OF THE INVENTION

The system of the invention may be incorporated into telephone answering machines of the type including an outgoing message magnetic tape mechanism in which an announcement is recorded on a magnetic tape, and which is activated during an announcement interval in response to ring signals received over the telephone line to cause the recorded announcement to be transmitted over the telephone line to the calling party during that interval; and an incoming message magnetic tape mechanism in which incoming messages are recorded on a magnetic tape in sequence.

The system of the invention may also be incorporated into telephone answering machines in which the outgoing message and incoming messages are recorded on a single tape; and in telephone answering machines in which the outgoing message is recorded in a solid state memory; and in other types of telephone answering machines.

The system of the invention also finds application in telephone answering machines which are equipped with a control system which causes the telephone answering machine to require a relatively large number of ring signals before it will seize the telephone line if no incoming messages have been recorded; but which requires a lesser number of ring signals to seize the line when one or more incoming messages have been received and recorded. Such a control system permits the user to call the machine by long distance from a remote location in order to pick up any messages that might be recorded on the machine. However, if there are no messages, he can then hang up before the machine seizes the telephone line, thus avoiding toll charges.

The system of the invention also finds application in telephone answering machines which are equipped with an indicator lamp that is continuously energized if there are no messages, but which flashes if one or more incoming messages have been received and recorded. This enables the user at a glance to determine whether there are any messages on the machine.

In addition, the system of the invention may be incorporated into telephone answering machines which are equipped with a call counter which indicates to the user how many incoming messages have been received and are recorded on the machine.

Most present-day telephone answering machines are controlled by a microcomputer, and when such telephone answering machines are first energized, the microcomputer goes through a reset routine during which it checks both the outgoing message and incoming message tape mechanisms, and sets both tape mechanisms to their "home" or "origin" positions; and then sets the machine to its "automatic answer" mode ready to respond to the next telephone call. The microcomputer in such machines also automatically sets the ring control system to its multiple ring condition, the call indicator lamp to its continuously energized condition, and the call counter to zero, when the machine is first energized.

In the prior art machines, when the machine is first connected to a power source the internal microcomputer causes both the outgoing message tape and incoming message tape to be set their "home" origin position, the ring control system to be set to its multiple ring state, the call indicator lamp be set to its continous state, and the call counter to be set to zero. However, in the prior art machine the foregoing operations also occur when power is restored after a power failure, and this means that any incoming messages recorded on the incoming message tape prior to the power failure are lost.

The system of the present invention provides a control for a telephone answering machine such that whenever power is applied to the telphone answering machine, the microcomputer first determines if any messages have previously been recorded on the incoming message tape. If such is the case, the incoming message tape is set to a position adjacent to the end of the last incoming message recorded on the tape; the ring control system is set to cause the telephone answering machine to seize the telephone line when the lesser number of rings is received, the call counter is set to a value which casues the indicator lamp to flash indicating that one or more calls have been received.

It is, accordingly, an object of the present invention to provide a relatively simple system in a telephone answering machine which responds, when power is restored after a power failure, to return the machine to the condition it was in just prior to the power failure.

DETAILED DESCRIPTION OF THE ILLUSTRATED EMBODIMENT

Only those portions of the circuits of FIGS. 1A, 1B, 1C and of FIGS. 2A and 2B which are necessary for a complete and full understanding of the control system of the present invention will be described.

Figure 1A:
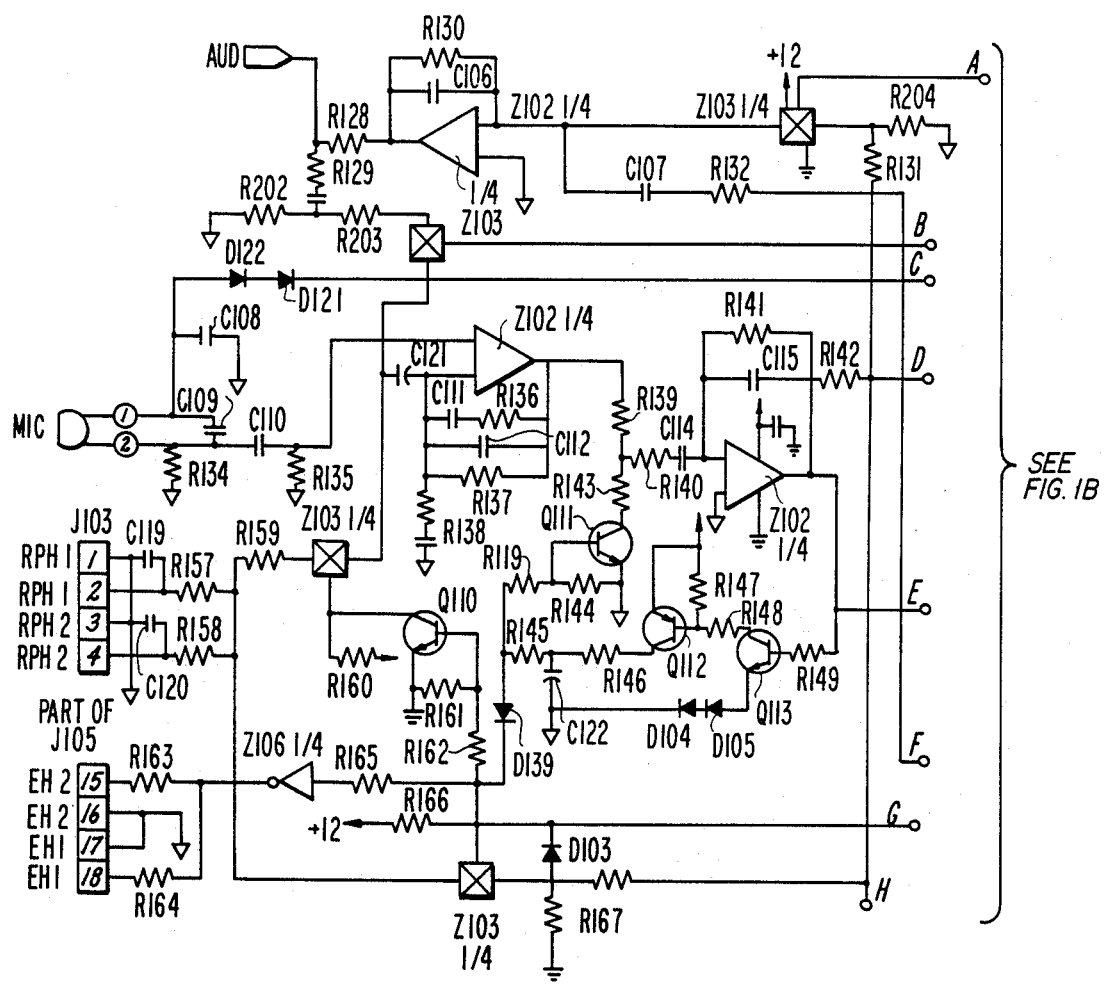
FIGS. 1A, 1B and 1C together constitute a circuit diagram of a telephone answering machine which incorporates the system of the invention.
Figure 1B:
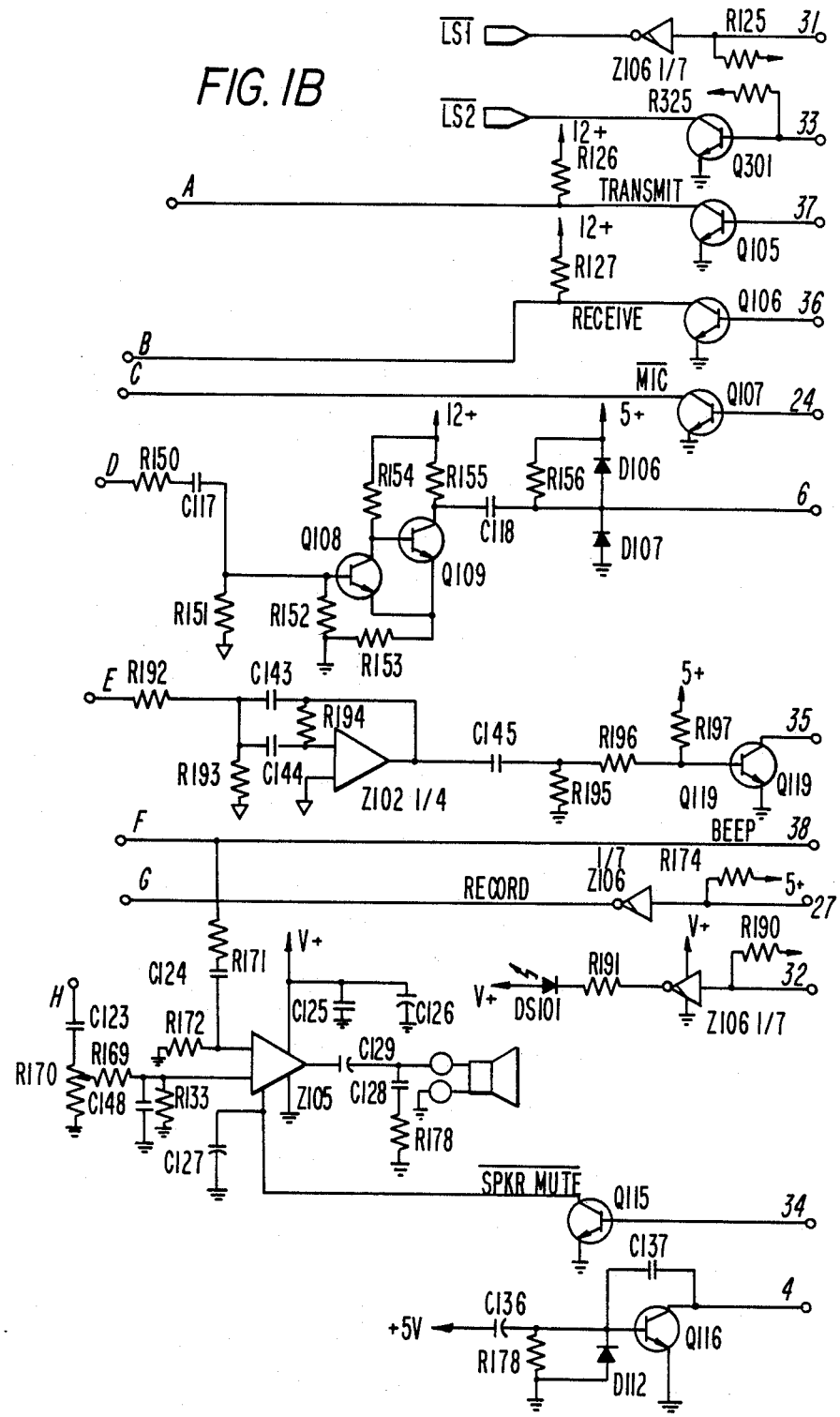
Figure 1C:
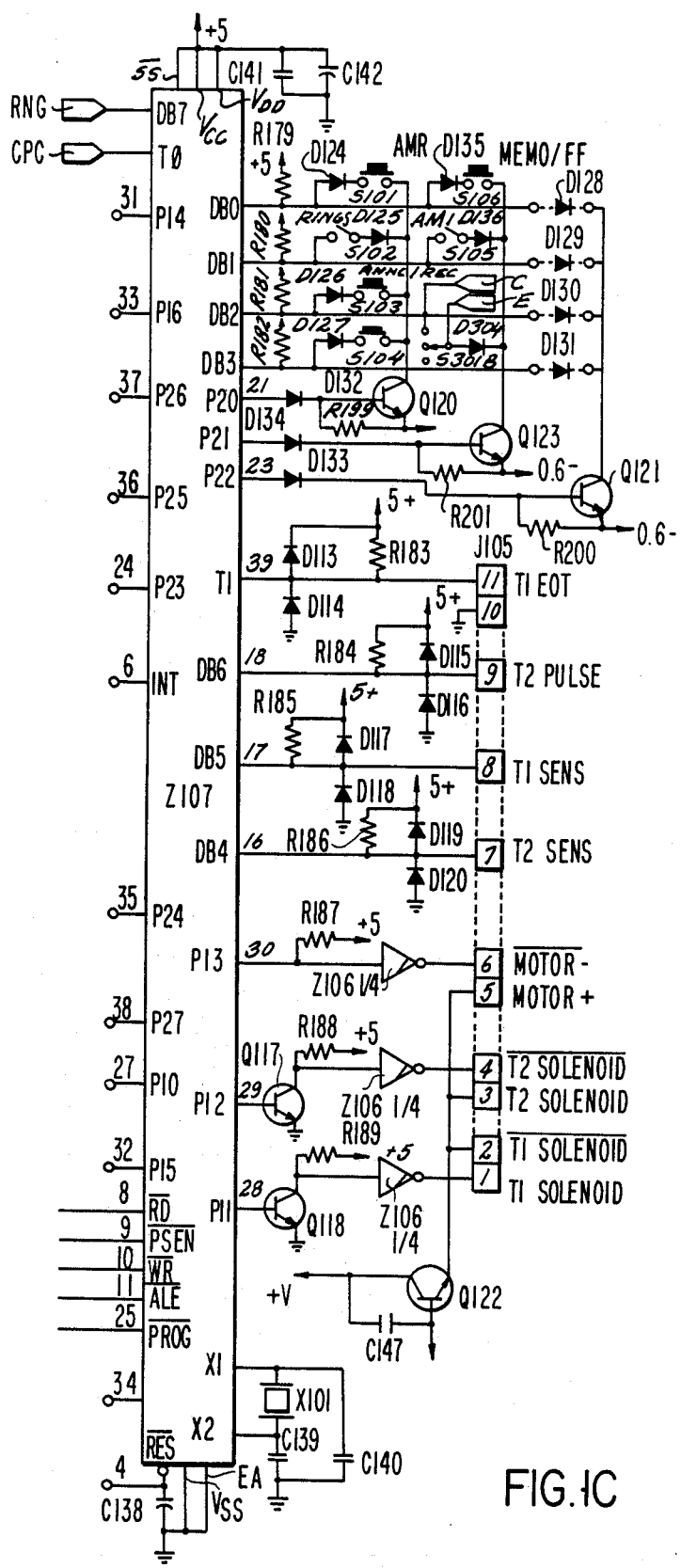
Figure 2A:
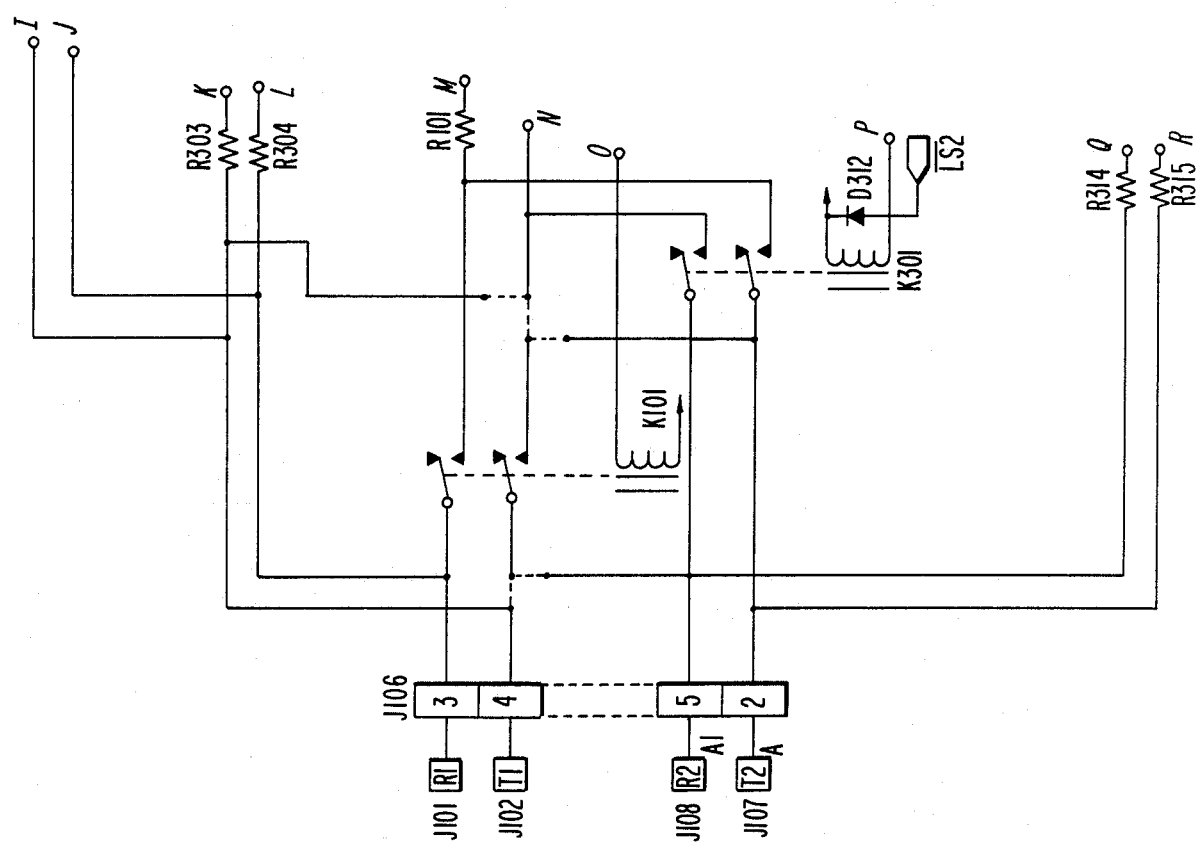
FIGS. 2A and 2B collectively represent a circuit diagram of another portion of the telephone answering machine.

The circuit of FIGS. 1A, 1B and 1C includes a microcomputer Z107 (FIG. 1C) which may be of the type designated 8050. When power is applied to the telephone answering machine, 5-volts is introduced to a differentiator circuit C136 and R178 to deliver a pulse of approximately 100 milliseconds to the base of transistor Q116. The differentiator circuit is made up of a 10 microfarad capacitor C136 and 10 kilo-ohm resistor R178. This pulse will render transistor Q116 conductive for that time period, holding the $\overline{\text{RESET}}$ pin 4 of microcomputer Z107 low, setting up the reset operation.

When reset is released, the computer will undergo an initial routine operation, during which it causes the announcement tape (T1) to assume its "home" position. Then, in accordance with the present invention, the microcomputer will set the incoming message tape to its rewind mode. As the message tape is rewinding, T2 pulses are introduced to pin 18 of the microcomputer Z107. If no pulses are received, it will indicate that the incoming message tape is already at its home position, and that no incoming messages have previously been recorded on that tape. The microcomputer will then set the telephone answering machine to its automatic answer condition in readiness for the next telephone call.

However, when the incoming message tape is set to its rewind mode by the microcomputer, and pulses are received at pin 18 in excess of a predetermined minimum number, this will usually indicate that there were incoming messages previously recorded on the incoming message tape. In that event, the microcomputer will cause the incoming message tape to move forward to the position it occupied before the rewind operation began, so that the previously recorded incoming messages may be preserved. Then, the telephone answering machine is set to its automatic answer mode, in readiness for the next call on the telephone line.

The circuit also includes a light emitting diode (LED) DS101 (FIG. 1B) which is powered by a circuit connected to pin 32 of the microcomputer Z107. Whenever received messages are stored on the incoming message tape, the LED flashes to indicate to the user that one or more incoming messages have been received. In the system of the invention, when power is applied to the telephone answering machine, and when the microcomputer Z107 determines that messages had previously been recorded on the incoming message tape, the LED is set to its flashing state. Otherwise, the LED is set to its continuously energized state.

The microcomputer Z107 includes an internal call counter which counts the number of incoming messages recorded on the incoming message tape, and this counter also causes the LED DS101 to flash when one or more incoming messages have been recorded on the tape. When power is applied to the telephone answering machine, and when the microcomputer determines that previous messages had been recorded on the incoming message tape, this counter is not reset and remains at its previous count, indicating the number incoming messages which had previously been recorded on the incoming message tape.

The microcomputer Z107 controls the magnetic tape mechanisms by way of a connector J105 (FIG. 1C). When pin 30 goes high, the drive motor for both magnetic tape mechanisms is activated. When pin 29 goes high, the T2 solenoid is energized to activate the incoming message magnetic tape mechanism; and when pin 28 is high, the outgoing message solenoid T1 is activated. The end of the outgoing message tape is sensed at pin 39, and the pulses from the incoming message tape are applied to pin 18. The end of the outgoing announcement tape informs the microcomputer that the tape is in its home position.

The pulses from the incoming message tape mechanism originate from a reed switch on the mechanism which senses motion thereof, with the reed switch providing four pulses per revolution of the incoming message tape mechanism. The T1 sense signal applied to pin 8 of the connector J105 is fed to pin 17 of the microcomputer, and indicates to the microcomputer that the T1 head is engaged. Likewise, the T2 sense signal applied to pin 7 of the connector is fed to pin 16 of the microcomputer and informs the microcomputer that the incoming message tape head is engaged.

A keyboard matrix is connected to pins 12-15 of the microcomputer Z107, the various columns of the matrix being selected through transistors Q120, 0123 and 0121 from pins 21, 22 and 23 of the microcomputer. The microcomputer scans the keyboard at regular intervals to determine the states of the various switches. The AMR pushbutton switch of the keyboard permits the user to play back all of the messages accumulated on the incoming message tape, merely by pressing the pushbutton switch and releasing it. The ring selection switch is closed after a ring selection has been made by the microcomputer Z107, selecting the number of rings to be received before the telephone answering machine will answer.

The ANNC/REC pushbutton switch, is depressed to set the machine to a mode in which a new announcement may be checked or a new announcement may be recorded. The STBY pushbutton switch, when activated, disengages the telephone answering machine from the telephone line. The MEMO/FF switch, when depressed, allows a memo to be dictated on the tape or moves the tape fast forward if incoming messages are being played back. The AMI switch, when closed, causes the machine to output an audible tone if an incoming message has been received. The diodes D128-D131 are selectively connected to establish a remote code for access to the machine.

Ring signals received over the telephone line appear across the tip and ring terminals 3 and 4 of connector J106, and are applied to operational amplifier Z101 through 22 meg-ohm resistors R102 and R103. These resistors are connected to differential amplifier Z101 (pins 2 and 3). Due to the values of R104 and R105, the output at pin 1 of Z101 is approximately 0.045 times the input voltage. This allows the high voltages that appear on the telephone line to be handled by the unit.

The next two stages of Z101 form an absolute value amplifier. The stage is set up such that regardless of the polarity of tip and ring, the difference voltage will always appear in a positive direction at pin 14 of Z101. The overall gain of the absolute value amplifier is 4.7. The output from pin 14 is fed to transistor Q104 through a voltage divider R112 and R113. The output of Q104 (marked RNG in FIG. 2B) is then coupled to the microcomputer input pin 19 in FIG. 1C. With the gain structure as described and the attenuation factor of R112 and R113, Q104 will be saturated for DC voltages greater than 25 volts at tip and ring. This provides an on-hook/off-hook indication to the microcomputer which is used for determination of dial tap.

Figure 2B:
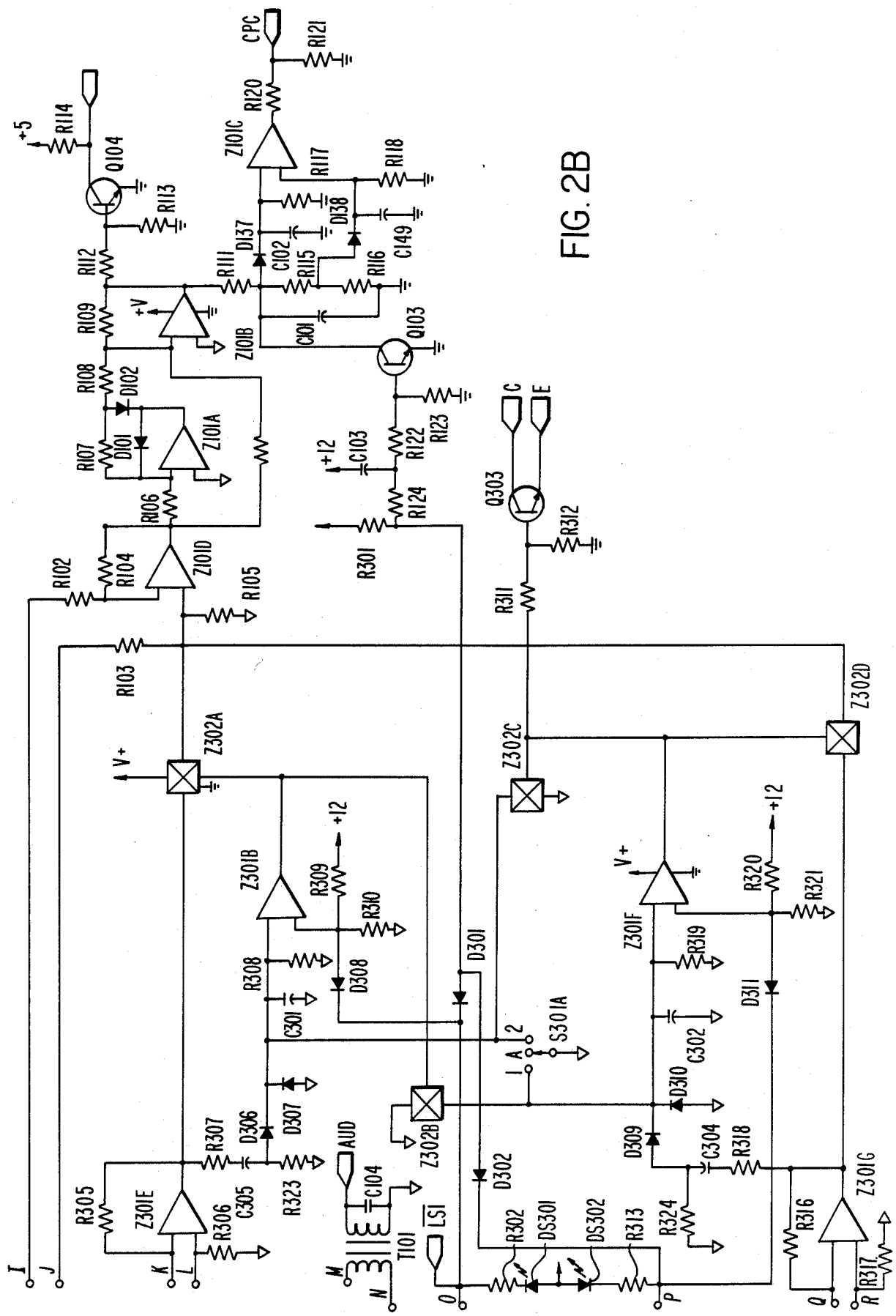

During ringing, transistor Q104 of FIG. 2B will be turned off and on. This toggling will be noted by the microcomputer and upon its cessation, the logic level at RNG (pin 19) of FIG. 1C will be examined. If the logic level is low, the toggling will be considered a valid ring. If the port is high, however, it will be assumed that toggling was caused by dial tap.

Upon the receipt of a valid ring signal, pin 37 of the microcomputer will go high to close the transmit circuitry of the telephone answering machine, so that the announcement recorded on the announcement tape may be transmitted to the calling party. At the end of the announcement interval, pin 37 will go low and pin 36 will go high, so that the telephone answering machine is set to receive the incoming message and cause the incoming message to be recorded on the incoming message tape T2.

As discussed above, the microcomputer Z107 responds only after a relatively large number of rings have been received, when no incoming messages have been recorded on the incoming message tape. However, after one or more messages have been recorded on the incoming message tape, the microcomputer causes the machine to respond to a lesser number of rings.

Accordingly, when a user remotes the machine over a long distance telephone line, if no messages have been received and recorded on the machine, he may hang up after the number of rings exceeds the lesser number, and he can thereby avoid toll charges. As also described, the system of the invention causes the toll saver system within the microcomputer to revert to the lesser number of rings state in the event that power is lost after incoming messages have been recorded on the incoming message tape.

The invention provides, therefore, a control system incorporated into a telephone answering machine, which operates in the event of power failure to cause the machine to revert to the state it was in just before the power failure, after power has been restored.

It will be appreciated that while a particular embodiment of the invention has been shown and described, modifications may be made. It is intended in the claims to cover all modifications which come within the true spirit and scope of the invention.

I claim:

1. In a telephone answering machine which includes a storage means in which incoming messages received over a telephone line are stored, a microcomputer, and first circuit means connected to the microcomputer and to the storage means for setting the storage means to a predetermined origin position during a reset operation occurring when power is applied to the telephone answering machine, the combination of: second circuit means connected to said storage means and to said microcomputer to introduce a control signal to said microcomputer to indicate the presence of any incoming messages in said storage means prior to its being set to its origin position by said microcomputer; and third circuit means connected to said microcomputer and to said storage means for causing said storage means to return to the position it was in prior to being set to its origin position by said microcomputer when said control signal indicate the presence of incoming signals in said storage means.

2. The combination defined in claim 1, in which said storage means comprises a magnetic tape mechanism, and said incoming messages are sequencially recorded on magnetic tape in said mechanism; and in which said first circuit means sets the magnetic tape to a predetermined origin position.

3. The combination defined in claim 2, in which said second circuit means introduces said control signals to said microcomputer said magnetic tape is displaced from said origin position.

4. The combination defined in claim 2, in which said magnetic tape mechanism includes means for generating pulses during movement of said magnetic tape in its rewind direction from a position displaced from said predetermined origin position to said origin position, and said second circuit means is connected to said microcomputer to supply such pulses to said microcomputer as said control signal.

5. The combination defined in claim 4, in which said microcomputer responds to the control signal introduced by said second circuit means to cause said third circuit means to return said magnetic tape to said displaced position when the number of pulses from said generating means exceeds a predetermined minimum.

6. The combination defined in claim 1, in which said telephone answering machine responds to ring signals received over the telephone line to seize the telephone line, and in which said microcomputer includes a control system having a first operational mode which causes said telephone answering machine to seize the telephone line after a predetermined number of ring signals has been received if no incoming messages have previously been stored in said storage means, and having a second operational mode which causes the telephone answering machine to seize the telephone line after a lesser number of ring signals has been received if one or more incoming messages have previously been stored in said storage means, and in which said second circuit means causes said microcomputer to set said control system to its second operational mode during said reset operation if one or more incoming messages had previously been received and stored in said storage means.

7. The combination defined in claim 1, and which includes circuitry connected to said microcomputer and including an indicator lamp, said microcomputer setting said lamp to a first visual state if no incoming messages have been stored in said storage means, and setting said lamp to a second visual state if one or more incoming messages have been stored in said storage means, and in which said second circuit means causes said microcomputer to set said indicator lamp to its second visual state during said reset operation if one or more incoming messages had previously been received and stored in said storage means.

8. The combination defined in claim 1, in which said microcomputer includes a counter for indicating that incoming messages are stored in said storage means; and in which said second circuit means causes said microcomputer to set said counter during said reset operation to a state representing that incoming messages had previously been stored in said storage means.

* * * * *